US012539255B2

(12) United States Patent
Tacchini

(10) Patent No.: US 12,539,255 B2
(45) Date of Patent: Feb. 3, 2026

(54) HEATING SYSTEM FOR CONTAINERS FOR PHARMACEUTICAL USE

(71) Applicant: STEVANATO GROUP S.P.A., Piombino Dese (IT)

(72) Inventor: Paolo Tacchini, Zola Predosa (IT)

(73) Assignee: STEVANATO GROUP S.P.A., Piombino Dese (IT)

( * ) Notice: Subject to any disclaimer, the term of this patent is extended or adjusted under 35 U.S.C. 154(b) by 0 days.

(21) Appl. No.: 19/057,222

(22) Filed: Feb. 19, 2025

(65) Prior Publication Data

US 2025/0268793 A1 Aug. 28, 2025

(30) Foreign Application Priority Data

Feb. 23, 2024 (IT) ........................ 102024000003907

(51) Int. Cl.
*A61J 1/16* (2023.01)

(52) U.S. Cl.
CPC ........................................ *A61J 1/16* (2013.01)

(58) Field of Classification Search
CPC ........................................................ A61J 1/16
USPC ........................................................ 198/493
See application file for complete search history.

(56) References Cited

U.S. PATENT DOCUMENTS

| | | | | |
|---|---|---|---|---|
| 5,022,165 | A * | 6/1991 | Beswick | B65B 55/10 422/115 |
| 8,501,110 | B2 * | 8/2013 | Windsheimer | B65B 55/025 422/307 |
| 11,548,687 | B2 | 1/2023 | Kusogullari et al. | |
| 2021/0253279 | A1 | 8/2021 | Anatrini | |

FOREIGN PATENT DOCUMENTS

| | | | |
|---|---|---|---|
| CN | 202844165 | U | 4/2013 |
| EP | 3423362 | B1 | 8/2021 |
| WO | 02051450 | A1 | 7/2002 |

OTHER PUBLICATIONS

EP3323432, Rinaldi (Year: 2018).*
Extended European Search Report issued on Jul. 2, 2025 in corresponding European Application No. 25157493.5.
Italian Search Report Sep. 2, 2024 for Italian Application No. 1020240000003907.

* cited by examiner

*Primary Examiner* — Gene O Crawford
*Assistant Examiner* — Lester Rushin, III
(74) *Attorney, Agent, or Firm* — Husch Blackwell LLP

(57) ABSTRACT

A heating system for containers for pharmaceutical use includes a heating tunnel; an entry station to the heating tunnel; an exit station from the heating tunnel and a transport device for containers for pharmaceutical use having at least one transport branch defining a first transport path between the entry station and the exit station from the heating tunnel and at least one return branch defining a second transport path between the exit station and the entry station. The transport branch and the return branch of the transport device may pass through the heating tunnel.

16 Claims, 7 Drawing Sheets

HEATING SYSTEM FOR CONTAINERS FOR PHARMACEUTICAL USE

CROSS REFERENCE

This application claims priority to Italian Patent Application No. 102024000003907 filed Feb. 23, 2024, the entire disclosure of which is expressly incorporated by reference herein.

TECHNICAL FIELD

The present disclosure relates to a heating system for containers for pharmaceutical use.

BACKGROUND

Containers for pharmaceutical use, such as syringes, carpules, vials and the like, undergo various operations, such as pre-washing, washing and heat treatment, which are carried out in succession to ensure the necessary sterile conditions of the containers for pharmaceutical use that are to contain pharmaceutical compounds.

Heat treatment operations comprise operations to heat containers for pharmaceutical use to relatively high temperatures, which are intended to sterilise, in particular depyrogenise, containers for pharmaceutical use to remove bacteria and pyrogenic compounds from the surfaces of containers for pharmaceutical use, or which are intended to harden silicone coatings applied to the surfaces of containers for pharmaceutical use, known in technical jargon as "baking" operations.

These heating operations are usually carried out using a heating system in which the containers for pharmaceutical use to be heated are placed on a conveyor belt that passes through a heating tunnel.

An example of such heating systems is shown in document EP3423362B1, in which a feeding station, a sterilisation station, a cooling station and a container transport unit are provided. The transport unit comprises a conveyor belt that forms an operating plane and advances along a forward direction and a plurality of support elements. The support elements are mutually separate and integral with the conveyor belt. Each support element comprises a plurality of shaped housings to temporarily accommodate respective containers. The transport unit passes from the feeding station, through the sterilisation station and into the cooling station. Passing through the sterilisation station allows the containers for pharmaceutical use supported by the support elements to undergo a sterilisation heat treatment.

In its constant efforts to improve and optimise its processes for preparing containers for pharmaceutical use (adapted to receive pharmaceutical compounds), the Applicant set out to make heating systems for containers for pharmaceutical use as effective as possible.

In this regard, the Applicant noted that the lower the degree of contamination of the containers for pharmaceutical use entering the heating tunnel, the more effective the removal of contaminants, such as bacteria and pyrogenic compounds, from the containers for pharmaceutical use during the passage through the heating tunnel.

Indeed, the Applicant noted that any contaminants, such as bacteria and pyrogenic compounds, which come into contact with the containers for pharmaceutical use during the heating operations of the containers for pharmaceutical use may reduce the sterilisation action, or even nullify the sterilisation action of the containers for pharmaceutical use, during the passage of the containers for pharmaceutical use through the heating tunnel.

The Applicant realised that a possible source of contaminants could come from the conveyors that support the containers for pharmaceutical use as they pass through the heating tunnel.

Indeed, in heating devices such as those summarised above, the conveyor on which the containers for pharmaceutical use are placed is not necessarily sterile before it enters the heating tunnel. Therefore, any contaminants present on the conveyor could be transferred to the containers for pharmaceutical use, contaminating them (further).

The Applicant noted that the conveyor and any other transport devices of containers for pharmaceutical use are sterilised together with the containers for pharmaceutical use as they pass through the heating tunnel.

Indeed, the Applicant noted that the sterilisation action of the heating tunnel operates not only on the containers for pharmaceutical use but also on the conveyor and any other devices passing through the heating tunnel.

SUMMARY

The Applicant perceived that the heating tunnel could be used not only to sterilise the containers for pharmaceutical use passing through it but also to sterilise the transport device for pharmaceutical containers before it receives the containers for pharmaceutical use to be transported through the heating tunnel.

The Applicant found that by arranging the transport device for the containers for pharmaceutical use with a transport branch running between a heating tunnel entry station and a heating tunnel exit station and with a return branch running between the heating tunnel exit station and the heating tunnel entry station, and by arranging both the transport branch and the return branch passing within the heating tunnel, the transport device for pharmaceutical containers remains substantially always within the heating tunnel, preventing possible contamination.

The present disclosure therefore relates to embodiments of a heating system for containers for pharmaceutical use that may include:

- a heating tunnel;
- an entry station to the heating tunnel;
- an exit station from the heating tunnel;
- a transport device for pharmaceutical containers comprising at least one transport branch comprising a conveyor belt defining a first transport path between the entry station and the exit station from the heating tunnel and at least one return branch comprising a conveyor belt defining a second transport path between the exit station and the entry station;
- wherein said transport branch and said return branch of the transport device pass through said heating tunnel.

In embodiments of the present disclosure, containers for pharmaceutical use travel along at least one transport branch following the first transport path between the entry station and the exit station from the heating tunnel, thus being sterilised and/or undergoing baking operations.

In addition, since the return branch of the transport device also passes through the heating tunnel between the exit station and the entry station to the heating tunnel, the transport device does not lose its sterility and is ready to receive further containers for pharmaceutical use to be sterilised and/or to be baked without being able to transfer contaminants to the containers for pharmaceutical use.

The Applicant also found that in this way it is possible to speed up the sterilisation and/or baking process of containers for pharmaceutical use, as it is not necessary to provide for special sterilisation operations of the transport device, which may require downtime, prior to receiving the containers for pharmaceutical use.

The Applicant also found that the proposed solution can also reduce the footprint of the heating system, as there is no need to provide space outside the heating tunnel for the positioning of the return branch of the transport system.

In the present description and the appended claims, the term "longitudinal" when referring to a direction, means a direction or orientation aligned with, parallel to or coinciding with a direct direction between the entry station and the exit station of the heating tunnel.

In the present description and the appended claims, the term "transverse" when referring to a direction, means a direction or orientation substantially perpendicular to a longitudinal direction and contained in a plane coincident with or parallel to a plane defined by the transport device.

Preferred features of the device of the heating system are provided hereinbelow, each of these features being capable of being provided individually or in combination with the others.

Preferably, the first transport path has the opposite direction to the second transport path.

Preferably, the first transport path runs in a longitudinal direction.

Preferably, the second transport path runs in a longitudinal direction.

Preferably, the first transport path is parallel to the second transport path.

In this way, the space required within the heating tunnel to contain both the at least one transport branch and the at least one return branch is minimised.

Preferably, the heating tunnel comprises at least one heat treatment chamber.

Within the at least one heat treatment chamber, the containers for pharmaceutical use undergo a heat treatment which at least partially implements a heat treatment recipe for containers for pharmaceutical use to sterilise or bake them.

Preferably, the heating tunnel comprises at least one thermal conditioning device to keep said at least one heat treatment chamber at a predetermined temperature.

In this way, the thermal conditioning device transfers heat or subtracts heat from the heat treatment chamber, stabilising its temperature at a level necessary to perform at least part of the heat treatment recipe for containers for pharmaceutical use.

Preferably, the heating tunnel comprises a plurality of heat-treatment chambers arranged in a longitudinal direction one after the other.

Preferably, the return branch passes through all the heat treatment chambers of the heating tunnel.

Preferably, the heating tunnel comprises a plurality of thermal conditioning devices to keep each heat treatment chamber at a predetermined temperature.

The plurality of thermal conditioning devices makes it possible to stabilise the temperature of each heat treatment chamber in such a way that the entire heat treatment recipe for containers for pharmaceutical use can be carried out.

Preferably, some of said consecutive heat treatment chambers are heating chambers at temperatures greater than 150° C. and less than 500° C., preferably greater than 200° C. and less than 400° C., more preferably greater than 250° C. and less than 350° C.

Preferably, at least one heat treatment chamber arranged closest to the exit station is a cooling chamber at room temperature, e.g. around 30° C.

The cooling chamber makes it possible to lower the temperature of the containers for pharmaceutical use so that they can leave the heating tunnel without suffering a thermal shock that could compromise their structural integrity.

Preferably, the heating system comprises a clean room and the heating tunnel is placed inside said clean room.

In this way, the heating tunnel is isolated from possible contaminants that could enter the tunnel and compromise the sterility of the containers for pharmaceutical use or the transport device.

Preferably, said clean room is ISO class 5.

Clean room classification is based on counting 0.5 micron microparticles in a defined volume of air. This classification or "certification" is issued by the manufacturer once the clean room is in operation, using a particle counter. The fewer particles counted, the "cleaner" the clean room and the lower the class.

The Applicant noted that the sterilisation and/or baking process of the containers for pharmaceutical use could be further accelerated by reducing the time required to load and unload the containers for pharmaceutical use from the transport device.

The Applicant in fact verified that the positioning of containers for pharmaceutical use on the transport device requires a high degree of precision necessary, on the one hand, to avoid two containers for pharmaceutical use being placed in contact with each other and, on the other hand, to maximise the ratio between the number of containers for pharmaceutical use on the transport device and the volume occupied by the containers for pharmaceutical use on the transport device. Such high positioning accuracy may require non-negligible positioning times. Furthermore, the Applicant verified that the removal of containers for pharmaceutical use from the transport device (after passing through the heating tunnel) also requires a high degree of precision so as not to damage the containers for pharmaceutical use.

The Applicant found that moving the containers for pharmaceutical use in sets of several containers for pharmaceutical use could further speed up the sterilisation and/or baking process of the containers for pharmaceutical use.

Therefore, in accordance with an aspect of the present disclosure, preferably said conveyor device comprises a plurality of trays, wherein each tray comprises a plurality of housing seats for respective containers.

In this way, the containers for pharmaceutical use can be placed in the housing seats even before they are positioned on the transport device, with each tray subsequently being moved to position it on the transport device. This considerably reduces the time required to correctly position each container for pharmaceutical use on the transport device, as it is sufficient to place only the tray on the transport device to achieve an orderly and proper arrangement of the containers for pharmaceutical use on the transport device. Similarly, when removing the containers for pharmaceutical use from the transport device, it is sufficient to remove a tray to simultaneously and efficiently remove a plurality of containers for pharmaceutical use from the transport device.

Preferably, each tray of said plurality of trays is configured to travel along said transport branch and said return branch.

Preferably, each tray of said plurality of trays is configured to be associated with and to be removed from said transport branch and/or said return branch.

In this way, the trays also do not lose the sterility achieved while travelling along the transport branch inside the heating tunnel, as the trays travel along the return branch inside the heating tunnel.

Preferably, each tray of said plurality of trays comprises an upper wall and a lower wall spaced along a transverse direction from said upper wall.

Preferably, each housing comprises a through-opening in said upper wall to allow for the passage of a respective container and said lower wall is configured to receive and support said containers.

The through-openings in the upper wall define a guide for the containers for pharmaceutical use to be arranged correctly in relation to each other, allowing the containers for pharmaceutical use to be easily and unambiguously positioned in the tray.

The bottom wall supports the bottom wall of the containers for pharmaceutical use, preventing them from moving freely and bumping into each other.

Preferably, each tray of said plurality of trays comprises an intermediate wall placed transversely between the upper and lower walls.

Preferably, each housing seat comprises a through-opening in said intermediate wall transversely aligned with a corresponding through-opening in the upper wall and configured to allow for the passage of a respective container.

In this way, the openings in the intermediate wall define the spatial orientation of the containers for pharmaceutical use in the tray.

The transverse alignment between the through-openings in the upper and middle walls positions the containers for pharmaceutical use essentially vertically, i.e. essentially perpendicular to the first transport path.

The Applicant found that this orientation of the containers for pharmaceutical use maximises the ratio between the number of containers for pharmaceutical use on the transport device and the volume occupied by the containers for pharmaceutical use on the transport device.

Preferably, each through-opening in said intermediate wall is identical in shape and size to the corresponding through-opening in said upper wall.

This prevents containers for pharmaceutical use from moving around in the housing seats on the tray.

Preferably, each through-opening in said upper wall is counter-balanced to a respective container.

This prevents containers for pharmaceutical use from moving around in the housing seats on the tray. In fact, arranging each through-opening counter-shaped to a respective container allows the container for pharmaceutical use to be inserted into the through-hole without clearance between the housing seat and the container for pharmaceutical use.

Preferably, each opening through said upper wall is circular in shape and has a diameter equal to the diameter circumscribing a section along a longitudinal plane of a container.

Preferably, the through-openings in said upper wall are equidistant from one other.

The Applicant found that this made the insertion and removal of containers for pharmaceutical use into the housing seats on the tray easier.

Indeed, the Applicant verified that it is possible to use automated loading and unloading devices, e.g. pneumatic suction-type devices, which have picking members equally spaced from one other.

Preferably, the distance between adjacent through-openings in the upper wall is such that direct contact between respective containers inserted in these through-openings is avoided.

Preferably, each housing seat comprises a through-hole in said lower wall, whereby each through-opening in the upper wall corresponds to a respective through-hole.

Preferably, at least one perimeter portion of each through-hole is configured to receive and support a respective container.

In this way, the bottom of the container for pharmaceutical use fits partially inside the through-hole, further improving the stability of the container for pharmaceutical use in the housing seat on the tray.

Preferably, each through-hole has a substantially identical shape and smaller size than the corresponding through-opening in the upper wall.

Alternatively, preferably each through-hole has a different shape than the corresponding through-opening in the upper wall.

In this case, at least one perimeter portion of each through-opening is not in a support relationship with a respective container.

The Applicant found that this created an empty space between the lower portion of the container for pharmaceutical use and the through-hole. This empty space can be used to better thermally condition the container for pharmaceutical use.

Indeed, the Applicant verified that, especially when the container for pharmaceutical use is heated by convection, conditioned (typically heated) air can flow into the empty space between the container for pharmaceutical use and the through-hole in the lower wall and directly hit the side walls of the container for pharmaceutical use.

Preferably, each transport branch and each return branch are configured to receive and retain a plurality of trays.

In this way it is possible to run several trays through the heating tunnel at the same time, significantly increasing production efficiency in terms of containers for pharmaceutical use treated in the unit of time.

Preferably, when a tray is associated with the transport branch, said tray travels on the first transport path.

In other words, it is not necessary to interrupt the transport of trays already associated with the transport branch in order to associate a further tray with the transport branch.

Preferably, when a tray is associated with the return branch, said tray travels along the second transport path.

Preferably, the heating system comprises at least a first pick and place device placed at said entry station.

Preferably, said at least a first pick and place device is configured to remove a tray from said return branch and to associate a tray with said transport branch.

In this way, the first pick and place device picks up empty trays from the return branch and places trays containing containers for pharmaceutical use on the transport branch.

In this regard, there is preferably a plurality of loading holders configured to receive and support said trays and placed at said entry station.

Preferably, said at least one first pick and place device is configured to insert and remove said trays from said loading holders.

In this way, empty trays from the return branch can be picked up and placed in the loading holders while waiting for containers for pharmaceutical use to undergo heat treatment to be inserted into the housing seats of one or more trays.

At the same time, trays that have already received containers for pharmaceutical use for heat treatment can be picked up and placed on the transport branch.

These trays that have already received containers for pharmaceutical use to undergo heat treatment can be temporarily housed in the loading holders or in other spaces at the entry station.

Empty trays can remain in the loading holders while receiving containers for pharmaceutical use to undergo heat treatment, or they can be moved to other spaces at the entry station during the loading operations of containers for pharmaceutical use.

Alternatively, the first pick and place device can be configured to insert containers for pharmaceutical use into an empty tray from the return branch, possibly without the need to insert the empty tray into the loading holders.

Preferably, the heating system comprises at least a second pick and place device placed at said exit station.

Preferably, said at least a second pick and place device is configured to remove a tray from said transport branch and to associate a tray with said return branch.

In this way, the second pick and place device picks up trays containing containers for pharmaceutical use from the transport branch and places empty trays on the transport branch.

In this regard, there is preferably a plurality of unloading holders configured to receive and support said trays and placed at said exit station.

Preferably, said at least a second pick and place device is configured to insert and remove said trays from said unloading holders.

In this way, full trays from the transport branch can be picked up and placed in the unloading holders while waiting for the heat-treated containers for pharmaceutical use to be removed from the housing seats of one or more trays.

At the same time, trays that have already been emptied of heat-treated containers for pharmaceutical use can be removed and placed on the return branch.

The trays can remain in the unloading holders while the heat-treated containers for pharmaceutical use can be moved into other spaces at the entry station during the unloading operations of containers for pharmaceutical use.

Alternatively, the second pick and place device can be configured to pick up containers for pharmaceutical use from a tray from the transport branch, possibly without the need to insert the tray into the unloading holders.

Preferably, each first pick and place device and each second pick and place device are anthropomorphic arms with six degrees of freedom.

Preferably, each tray comprises gripping handles to be gripped by a first pick and place device and/or a second pick and place device.

In this way, the trays can be easily taken from the transport branch and return branch and placed on the transport branch and return branch without interfering with the containers for pharmaceutical use.

Preferably, the heating system comprises a loading chamber at the entry station.

Preferably, the loading chamber is placed inside a first further clean room.

In this way, the loading chamber acts as a preparatory chamber before the entry to the heating tunnel, ensuring that pharmaceutical devices, objects and containers for pharmaceutical use entering the loading chamber are not contaminated by contaminants.

Preferably, the first further clean room within which the load chamber is placed is ISO Class 6.

Preferably, each first pick and place device is placed within said load chamber and operates within the load chamber.

Similarly, the loading holders are preferably placed inside the loading chamber.

In this way, both the loading holders and the first pick and place device remain sterile while operating on the trays and possibly the containers for pharmaceutical use.

Preferably, said first further clean room comprises an insertion opening and said loading holders can be inserted and removed from said insertion opening.

This allows the loading holders and any trays they contain to be inserted and removed from the first further clean room, for example to carry out maintenance, checking or restoration operations and to insert the containers for pharmaceutical use to undergo heat treatment into the loading chamber.

Preferably, the heating system comprises an unloading chamber at the exit station.

Preferably, the unloading chamber is placed inside a second further clean room.

In this way, the unloading chamber acts as a working chamber after the exit from the heating tunnel, ensuring that the containers for pharmaceutical use leaving the heating tunnel and entering the unloading chamber do not lose the sterility they have achieved.

Preferably, the second further clean room within which the unloading chamber is located is ISO class 6.

Alternatively, the loading chamber, unloading chamber and heating tunnel are advantageously placed within a common isolation clean room, also of ISO class 6.

Preferably, each second pick and place device is placed inside said unloading chamber and operates within the unloading chamber.

Likewise, the unloading holders are preferably placed inside the unloading chamber.

In this way, both the unloading holders and the second pick and place device remain sterile while operating on the trays and containers for pharmaceutical use undergoing heat treatment.

Preferably, said second further clean room comprises an exit opening and said unloading holders can be inserted and removed from said exit opening.

This allows the unloading holders and any trays contained therein to be inserted into and removed from the second further clean room, e.g. to carry out maintenance, inspection or repair work, and to remove the containers for pharmaceutical use undergoing heat treatment from the unloading chamber.

The Applicant verified that it would be appropriate for the number of trays travelling through the transport branch in the unit of time to be equal to the number of trays travelling through the return branch in the same unit of time, so that there would always be empty trays available at the entry station to the heating tunnel.

The Applicant perceived that the trays that are to travel along the return branch are already in a sterile condition and the transit along the return branch has the function of not causing the trays to lose the sterility they have achieved. Therefore, the return branch can be travelled along by the trays at a higher speed than the travel speed of the transport branch (necessary to ensure proper heat treatment of the containers for pharmaceutical use).

The Applicant therefore realised that the number of heat-treated containers for pharmaceutical use in a unit of time could be increased by increasing the number of transport branches running through the heating tunnel at the same time, without necessarily having to increase the return branches to the same extent.

Therefore, preferably, the heating system comprises a number R of return branches and a number M of transport branches, wherein M and R are integers and wherein M is greater than R.

The travel speed of the trays along the return branches can be higher than the travel speed of the trays along the transport branches.

Preferably, the number of trays travelling, in the unit of time, along the transport branches is equal to the number of trays travelling, in the same unit of time, along the return branches.

Preferably, the transport branches are independent of each other. In other words, the conveyor belts that define the transport branches preferably move independently of each other.

Preferably, the return branches are independent of each other. In other words, the conveyor belts defining the return branches preferably move independently of each other.

Preferably, the transport branches are independent of the return branches. In other words, the conveyors defining the return branches preferably move independently of the conveyors defining the transport branches.

In this way, in the event of a conveyor belt malfunction or any other impediment that requires the conveyor belt to be stopped, the heating system is still able to continue the heat treatment of the containers for pharmaceutical use.

Preferably, a plurality of trays are simultaneously present on each transport branch of said M transport branches and wherein the trays simultaneously present on a transport branch are spaced from each other in the longitudinal direction by identical distances D1.

These identical distances D1 can for example be given by the distance that the conveyor belt of the transport branch travels during the time between the positioning of two successive trays on the same transport branch.

Preferably, the distance D1 is equal to a length L of a tray multiplied by a factor F, wherein the factor F is a number greater than or equal to M−1.

Obviously, in the case where M is equal to 1, F must necessarily be greater than M−1.

For example, if the number M of transport branches is equal to 6 and the number R of return branches is equal to 2, the factor F is a number greater than 5. This means that the distance D1 between two consecutive trays on a transport branch is equal to at least 5 times the length L of a tray.

The Applicant also verified that the distance D1 calculated according to the above-mentioned formula is such that the first pick and place device is able to place a tray on the transport branch and reposition itself in order to pick up a subsequent tray and place it on the transport branch without interrupting the movement of the transport branch.

The Applicant also verified that the distance D1 calculated according to the above formula is such that the second pick and place device is able to pick up a tray from the transport branch, manipulate it, e.g. to insert it into an unloading holder, and reposition itself in order to pick up a subsequent tray transported by the transport branch before that subsequent tray reaches the exit station from the heating tunnel.

Preferably, on all the transport branches of said M transport branches the trays are spaced in the longitudinal direction by said distances D1.

Preferably, a plurality of trays are simultaneously present on each of said R return branches and where the trays simultaneously present on a return branch are spaced in the longitudinal direction from each other by identical distances D2.

Preferably, the distances D2 are smaller than the distances D1.

Preferably, a first travel time T between said entry station and said exit station of any tray associated with a respective transport branch of said M transport branches is equal to a first travel time T of any other tray associated with any other transport branch between said entry station and said exit station.

In this way, all containers for pharmaceutical use, regardless of the transport path they will travel along, will undergo the same heat treatment.

Preferably, the first travel time T is comprised between 5 minutes and 50 minutes, more preferably comprised between 10 minutes and 40 minutes, even more preferably comprised between 15 minutes and 35 minutes.

Preferably, the transport speed of any one tray is identical along any one transport branch.

Preferably, the transport speed of any one tray is constant along any one transport branch.

Preferably, a second travel time T1 between said exit station and said entry station of any tray associated with a respective return branch of said R transport branches is less than the first travel time T between said entry station and said exit station of any tray associated with a respective transport branch of said M transport branches.

As mentioned above, in this way the number of return branches can be reduced in relation to the number of transport branches.

The Applicant perceived that if trays transported by a transport branch reached the exit station from the heating tunnel at different times, it would be possible to pick up or handle each tray reaching the exit station without other trays waiting in the exit station.

The Applicant found that in this way there is no need to interrupt the conveyor belts of the transport branches and no build-up of trays to be picked up or handled in the exit station of the heating tunnel.

Therefore, preferably, an instant of association of a tray with a transport branch of said M transport branches is different from an instant of association of a tray with any other transport branch of said M transport branches.

By associating the trays with their respective transport branches at different instants, the trays reach the exit station at different instants.

The Applicant also verified that this allows the use of fewer pick and place devices than the number of transport branches, as one and the same pick and place device can serve several transport branches without a build-up of trays on the transport branches served by the same pick and place device.

Preferably, the instances of association of trays on the same transport branch are separated from each other by identical first waiting times.

Preferably, the first waiting time between two instants of association of two consecutive trays on the same transport branch divided by the number M of transport branches is greater than or equal to the time required by the first pick and place device to pick up a tray and associate it with a transport branch.

This also ensures that the distances D1 separating the trays on the transport branch are constant.

Preferably, the instances of association of trays on each transport branch are separated from each other by identical first waiting times.

In this way, it is also possible to ensure that the distances D1 separating the trays on any transport branch are constant.

Preferably, the instant of association of a tray on one transport branch does not correspond to any other instant of association on any other transport branch.

This allows only one tray to be loaded at a time at the input station, regardless of the number of transport branches.

The Applicant verified that this makes it possible to use, at least potentially, only one first pick and place device as two trays must never be placed on the transport branches at the same time.

Preferably, an instant of removal of a tray from a transport branch of said M transport branches is different from an instant of removal of a tray from any other transport branch of said M transport branches.

The Applicant verified that this makes it possible to use, at least potentially, only a second pick and place device as two trays never have to be taken from the transport branches at the same time.

Preferably, the instant of removal of a tray from one transport branch does not correspond to any other instant of removal from any other transport branch.

Preferably, the instants of removing trays from the same transport branch are separated from each other by identical second waiting times.

Preferably, the instants of removing trays from each transport branch are separated from each other by identical second waiting times.

Preferably, the first waiting times are equal to the second waiting times.

Preferably, the number of trays carried by said M transport branches in a predetermined time interval is equal to the number of trays carried by said R return branches in said predetermined time interval.

These and other aspects are merely illustrative of the innumerable aspects associated with the present disclosure and should not be deemed as limiting in any manner. These and other aspects, features, and advantages of the present disclosure will become apparent from the following detailed description when taken in conjunction with the referenced drawings.

BRIEF DESCRIPTION OF THE DRAWINGS

Reference is now made more particularly to the drawings, which illustrate the best presently known mode of carrying out the present disclosure and wherein similar reference characters indicate the same parts throughout the views.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

In the following detailed description numerous specific details are set forth in order to provide a thorough understanding of the present disclosure. However, it will be understood by those skilled in the art that the present disclosure may be practiced without these specific details. For example, the present disclosure is not limited in scope to the particular type of industry application depicted in the figures. In other instances, well-known methods, procedures, and components have not been described in detail so as not to obscure the present disclosure.

The headings and sub-headings used herein are intended only for general organization of topics within the present disclosure and are not intended to limit the disclosure of the technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

Figure 1:
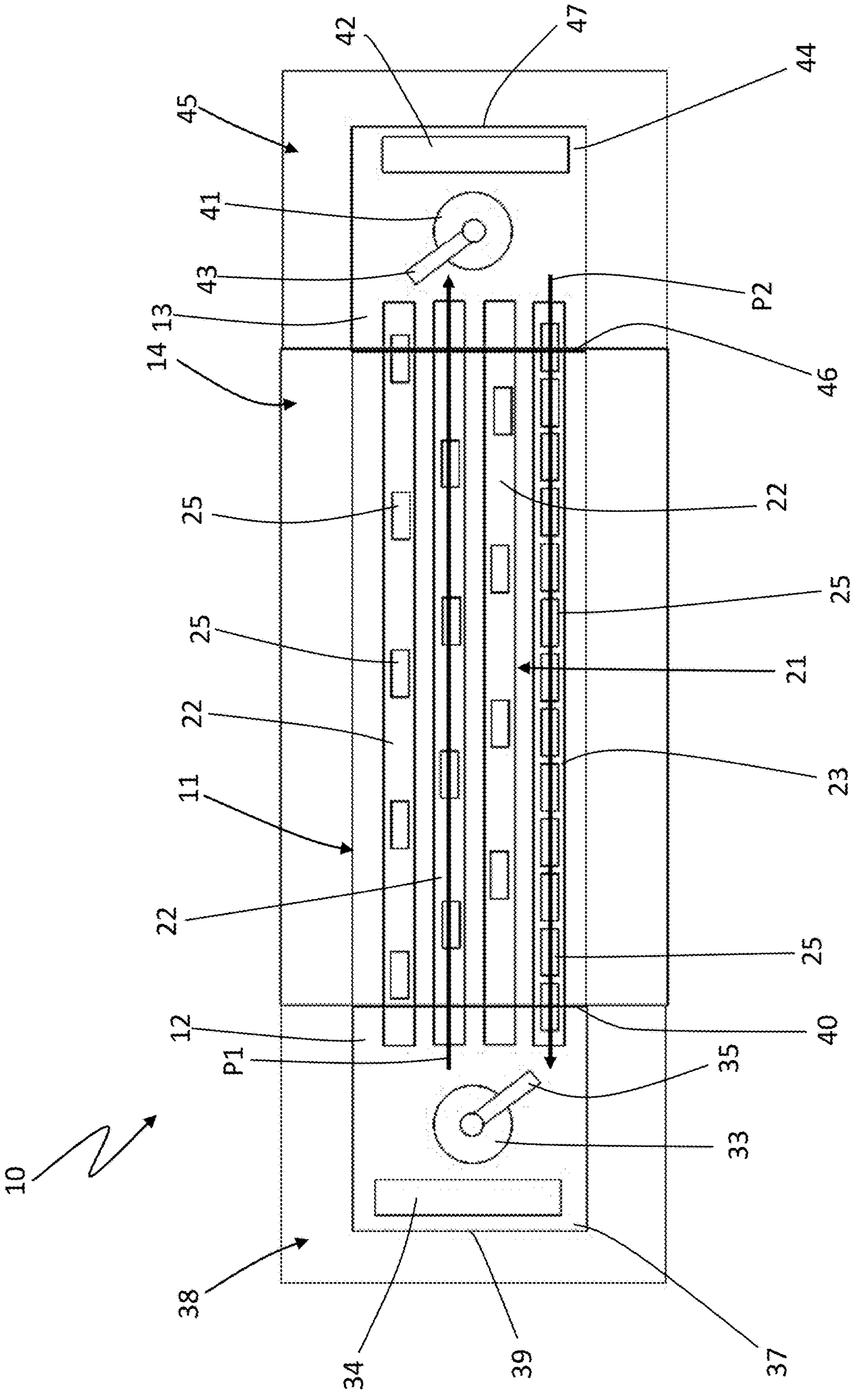
FIG. 1 shows a schematic view from above of a heating system in accordance with the present disclosure.

An embodiment of a heating system in accordance with the present disclosure is shown in FIG. 1 by reference number 10.

The system 10 comprises a heating tunnel 11 configured to for the heat treatment of containers for pharmaceutical use 100. The heat treatment carried out by the heating tunnel 11 involves heating containers for pharmaceutical use 100 to relatively high temperatures, e.g. above 250° C., in order to sterilise them or to carry out a "baking" treatment in order to harden silicone coatings of containers for pharmaceutical use 100.

The containers for pharmaceutical use 100 are, in the example shown in the accompanying figures, essentially cylindrical containers. However, containers for pharmaceutical use 100 can come in different shapes, as will be evident below. The containers for pharmaceutical use 100 can be, for example, syringes, carpules, vials and the like.

As schematically depicted in FIGS. 1 to 4, the system 10 comprises an entry station 12 to the heating tunnel 11 and an exit station 13 from the heating tunnel 11. The entry station 12 is configured to allow the containers for pharmaceutical use 100 to enter the heating tunnel 11 and the exit station 13 is configured to allow the containers for pharmaceutical use 100 to exit the heating tunnel 11.

As schematically illustrated in FIG. 1, the system 10 comprises a clean room 14 with the heating tunnel 11 inside it. The clean room 14. The clean room 14 is a contamination-controlled environment whose purpose is to provide an environment that limits the presence of particles inside it by adopting air filtration systems suited to the purpose. The clean rooms are classified according to the level of cleanliness of the air inside them and, based on the amount and size of particles per volume of air, a class of merit is assigned according to the ISO-14644-1 standard. This standard provides for classes ISO 1 to ISO 9, with ISO 1 being the "cleanest" class and ISO 9 being the "dirtiest" class. In the preferred embodiment of the present disclosure, the clean room 14 is ISO class 5.

Figure 2:
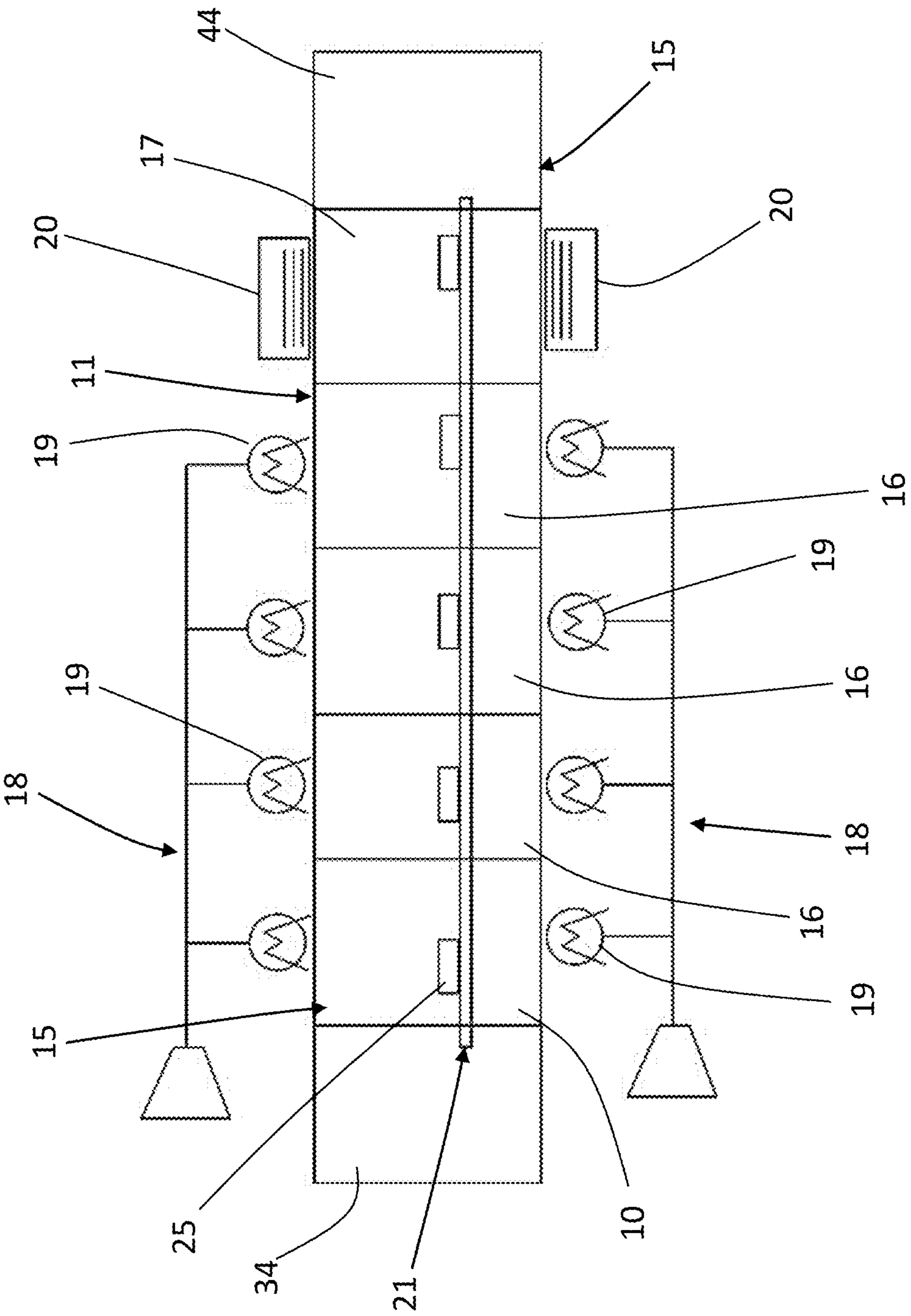
FIG. 2 shows a schematic side view of a heating system in accordance with the present disclosure.

As schematically illustrated in FIG. 2, the heating tunnel 11 comprises a plurality of mutually consecutive heat treatment chambers 15.

The heat treatment chambers 15 comprise a plurality of heating chambers 16 followed by one or more cooling chambers 17. Adjacent to the entry station 12 is a heating chamber 16 and adjacent to the exit station 13 is a cooling chamber 17.

Preferably, the heat treatment chambers 15 are separated from each other by shutters (not shown) and/or air blades. This makes it possible to interrupt the flow of trays 25 through the tunnel and intervene individually for short periods on a single heat treatment chamber 15 without compromising the operating and sterile conditions of the other heat treatment chambers 15.

In the heating tunnel 11 there are a plurality of heat conditioning devices 18. As schematically illustrated in FIG. 2, at least one thermal conditioning device 18 acts on each heat treatment chamber. The thermal conditioning devices 18 may be air heaters 19 or air coolers 20. The air heaters 19 are active on the heating chamber 16 and the air coolers 20 are active on the cooling chamber(s) 17. In each heating chamber 16, the temperature can be controlled and maintained at predefined values usually above at least 200° C. In each cooling chamber 17, the temperature can be controlled and maintained at predefined values usually close to room temperature (e.g. about 25° C.). In the heating chambers 16 closest to the cooling chambers 17 the temperature can be kept lower than the mentioned 200° C. to avoid thermal shocks to the pharmaceutical 100 containers.

Figure 3:
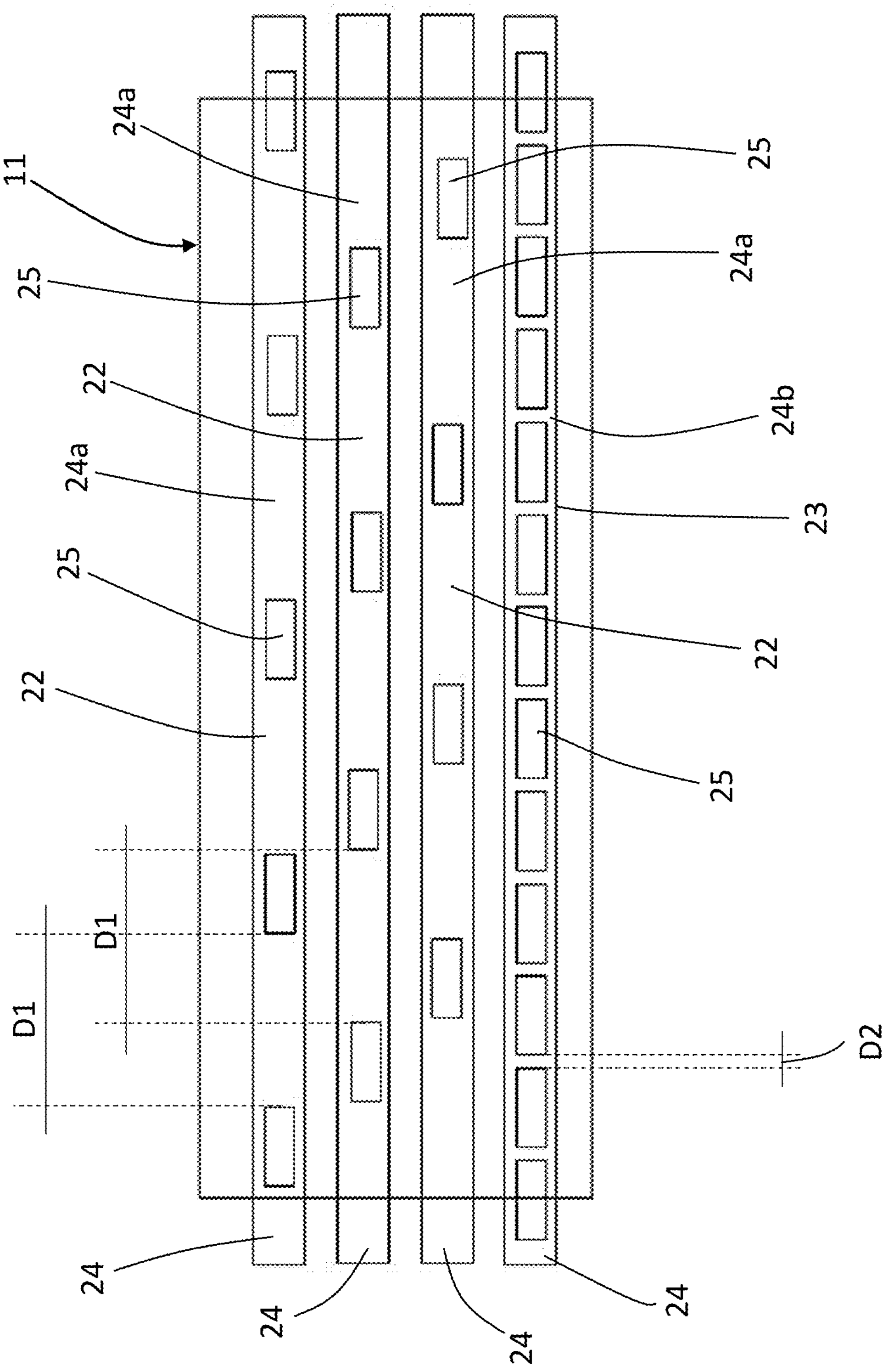
FIG. 3 shows a schematic view from above of some details of the heating system in FIG. 1 in a first embodiment.
Figure 4:
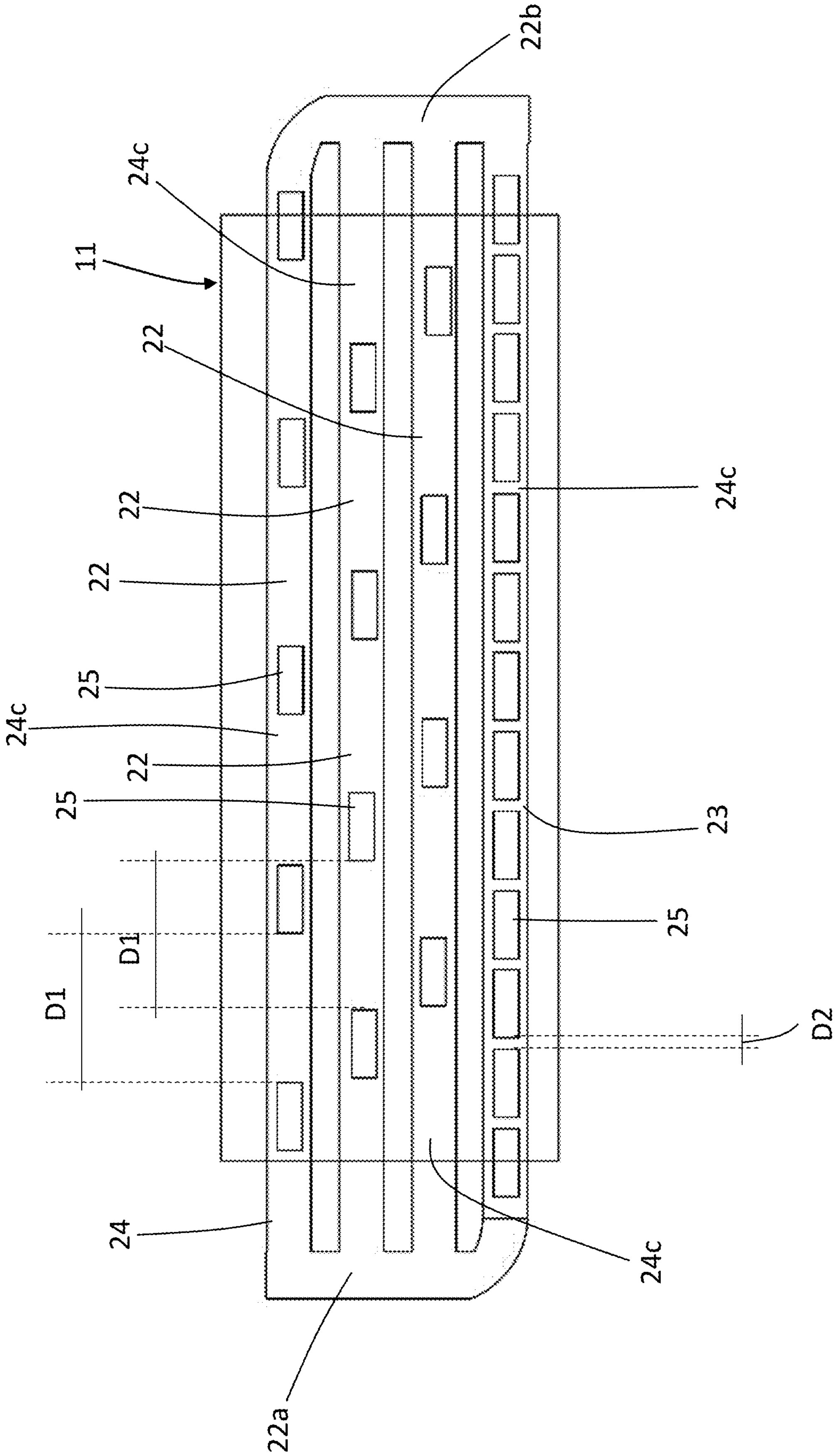
FIG. 4 shows a schematic view from above of some details of the heating system in FIG. 1 in a second embodiment.

As schematically illustrated in FIGS. 1, 3 and 4, the system 10 comprises a conveyor device 21 for containers for pharmaceutical use 100. The transport device 21 has the function of transporting containers for pharmaceutical use 100 inside the heating tunnel 11. In particular, the transport device 21 transports the containers for pharmaceutical use 100 between the entry station 12 and the exit station 13 of the heating tunnel 11.

The transport device 21 comprises at least one transport branch 22 and at least one return branch 23. In the embodiment illustrated in the accompanying figures, there are three transport branches 22 and one return branch 23. However, there may be any number of transport branches 22 (depending on production requirements) greater than one and fewer return branches 23 than transport branches 22. In the following, explicit reference will be made to three transport branches 22 and one return branch 23.

The transport branch 22 and the return branch 23 pass through the heating tunnel 11 in a longitudinal direction. The transport branch 22 defines a first transport path P1 through the heating tunnel 11 between the entry station 12 and the exit station 13 and the return branch 23 defines a second transport path P2 through the heating tunnel 11 between the exit station 13 and the entry station 12.

The transport branches 22 and return branches 23 are implemented by one or more conveyor belts 24.

In the embodiment shown in FIGS. 1 and 3, each transport branch 22 comprises a conveyor belt 24*a* and the return branch 23 comprises a conveyor belt 24*b*. In this embodiment, the conveyor belts 24*a*, 24*b* of the transport branch 22 and return branch 23 are independent of each other.

In the embodiment shown in FIG. 4, each transport branch 22 comprises a conveyor belt 24*c* and the return branch 23 comprises a conveyor belt 24*c*. A single conveyor belt 24*c* with several longitudinal sections or longitudinal branches implements both the transport branch 22 and the return branch 23. In this embodiment, each transport branch 22 is defined by a respective longitudinal section of the conveyor belt 24*c* and the return branch 23 is defined by a further longitudinal section of the conveyor belt 24*c*. Connecting sections are provided at the ends of the longitudinal sections of the conveyor belt 24*c*. These connecting sections define an entry connecting section 22*a* at the entry station 12 and an exit connecting section 22*b* at the exit station 13. In other words, in this embodiment, each transport branch 22 and the return branch 23 are associated with a respective conveyor belt 24*c* that can form a single conveyor belt through the connecting sections.

For example, the entry connecting section 22*a* and the exit connecting section 22*b* each comprise one or more 180° bends (not shown), movable integrally with the conveyor belt 24*c*, and intended to connect each transport branch 22 with a return branch 23. In this way it is possible to pick up only the containers for pharmaceutical use 100 exiting the heating tunnel 11 and to avoid the lifting the trays 25 by a first pick and place device 33 and a second pick and place device 41 (described in more detail below).

In fact, by means of the 180° bend mentioned above, and optionally with the help of one or more deflectors (not shown) these trays 25 are directly diverted from the transport branch 22 to the return branch 23.

In both embodiments, the conveyor belt 24*a* (or the longitudinal sections of conveyor belt 24*c*) of the transport branches 22 move from the entry station 12 to the exit station 13 and the conveyor belt 24*b* (or the longitudinal section of the conveyor belt 24*c*) moves from the exit station 13 to the entry station 12.

The transport speeds of the conveyor belts 24*a* (or the longitudinal sections of the conveyor belt 24*c*) of the transport branches 22 are identical to each other.

At least in the embodiment shown in FIGS. 1 and 3, the conveyor belt 24*b* of the return branch 23 has a higher transport speed than the conveyor belt 24*a* of the transport branches 22.

Figure 6:
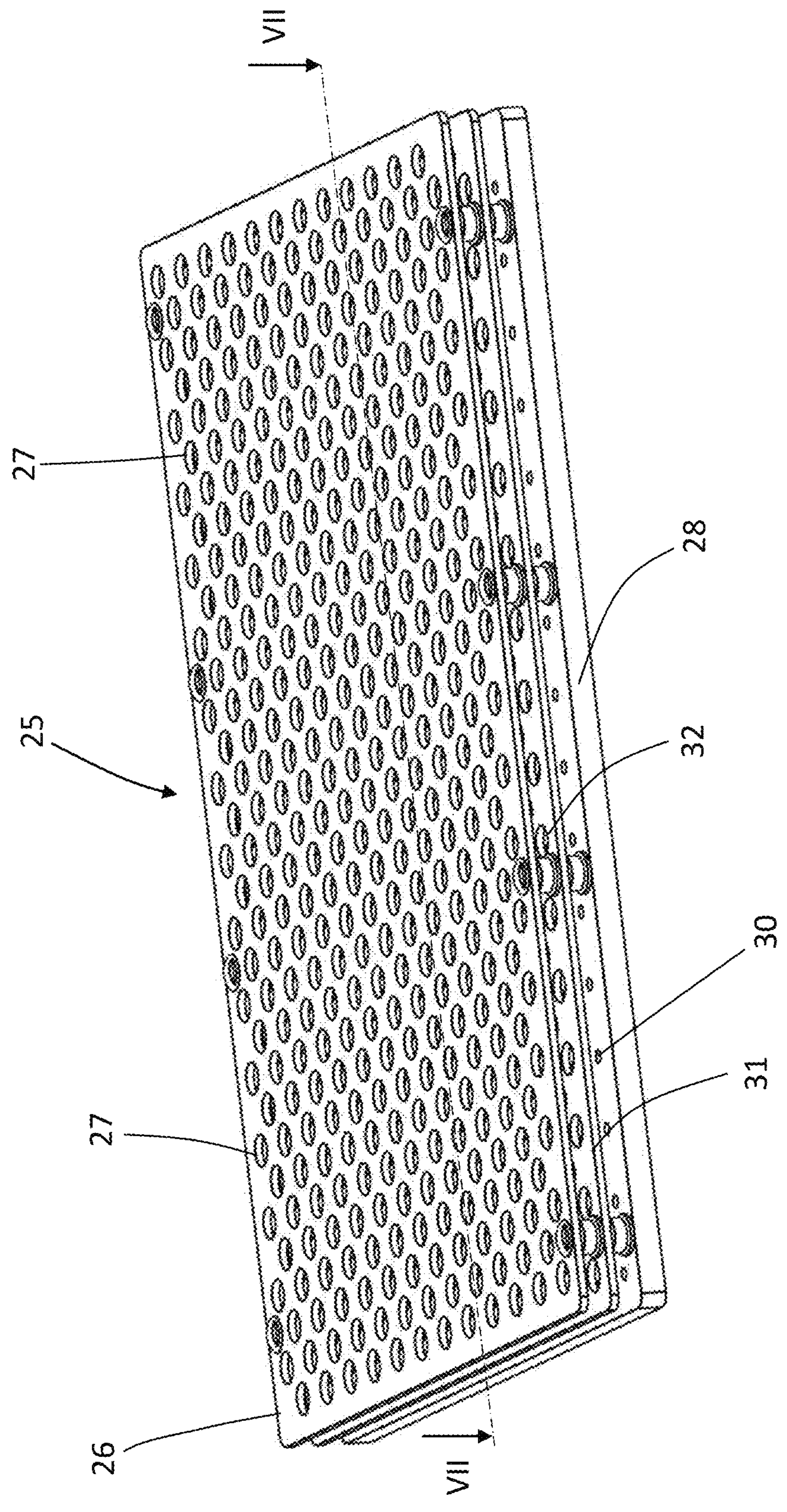
FIG. 6 shows a perspective schematic view of the detail of FIG. 5, with some parts removed to better highlight others.

The system 10 further comprises a plurality of trays 25 each configured to house a plurality of containers for pharmaceutical use 100, as depicted in FIG. 6.

Figure 5:
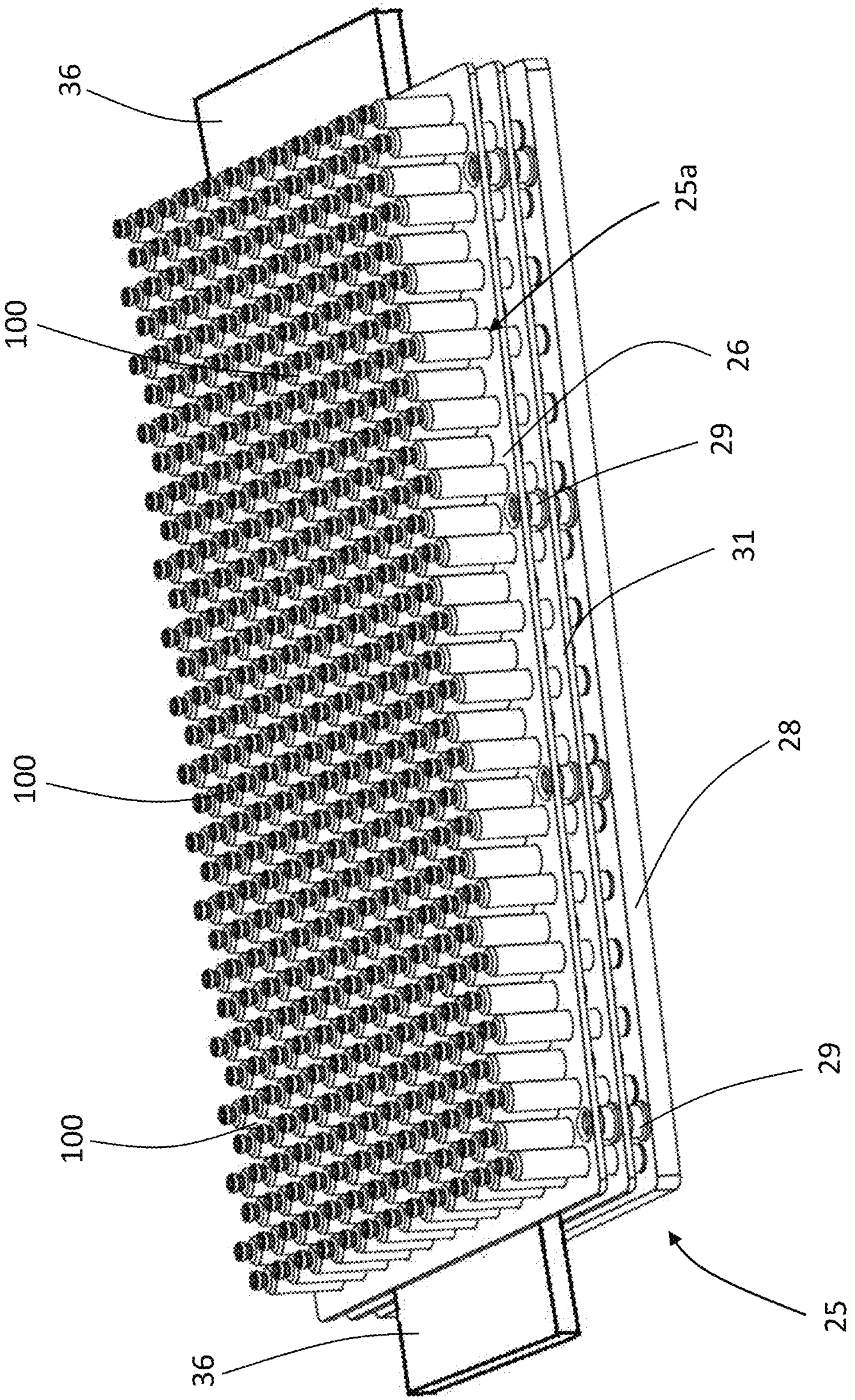
FIG. 5 shows a perspective schematic view of a detail of the heating system of FIG. 1.
Figure 7:
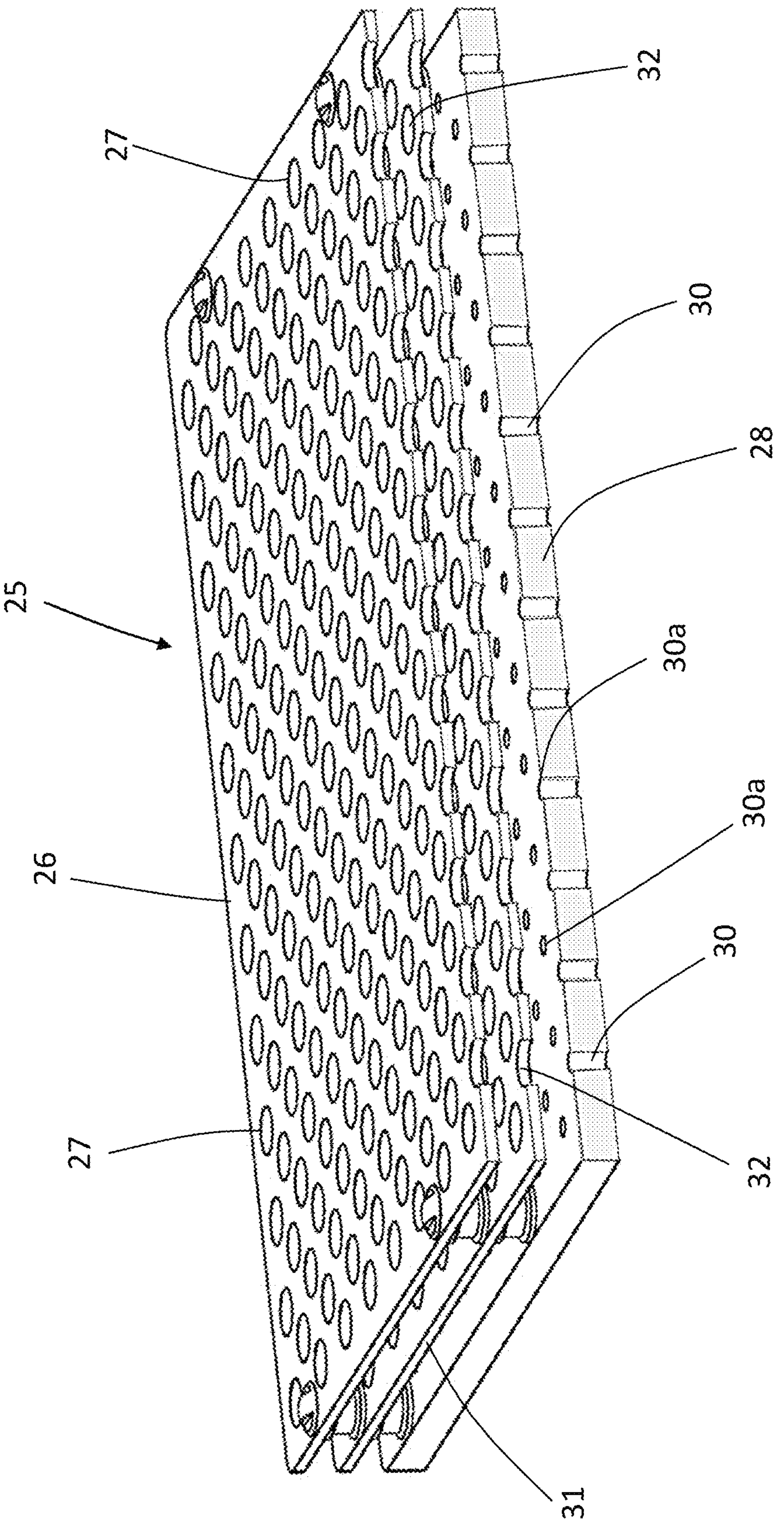
FIG. 7 is a perspective schematic view along the plane VII-VII of the detail of FIG. 6.

As shown in FIGS. 5 to 7, each tray 25 comprises a plurality of housing seats 25*a*, in particular one housing seat 25*a* for each container for pharmaceutical use 100.

Each tray 25 comprises an upper wall 26 comprising a plurality of through-openings 27. The through-openings 27 are equidistant from each other and evenly distributed on the upper surface 26, as shown in FIG. 6. The through-holes 27 have a counter-shaped shape to a longitudinal section of the container for pharmaceutical use 100. In the embodiment illustrated, in which the containers for pharmaceutical use 100 are essentially cylindrical, the through-openings 27 are circular. In the event that the containers for pharmaceutical use 100 are all identical to each other, as in the preferred embodiment of the present disclosure, all the through-openings 27 are identical to each other. The size of each through-opening 27 is essentially the same as the size of the longitudinal section of a container for pharmaceutical use

100. In other words, each container for pharmaceutical use 100 is inserted to size in a respective through-opening 27, as shown in FIG. 5.

Each tray 25 further comprises a bottom wall 28 spaced in a transverse direction from the top wall 26. The upper wall 26 and the lower wall 28 are connected to each other by spacers 29. The lower wall 28 receives and supports a portion of the lower end of each container for pharmaceutical use 100, as schematically shown in FIG. 5. For this purpose, as further illustrated in FIG. 7, the lower wall comprises a plurality of through-holes 30 wherein each through-hole 30 is aligned with a corresponding through-opening 27 in the upper wall 26. The through-holes 30 are of such a size and/or shape that the containers for pharmaceutical use 100 cannot pass through the through-holes 30 themselves. For this purpose, the through-holes 30 comprise a perimeter portion 30*a* which makes at least partial contact with the lower end portion of the containers for pharmaceutical use 100. In a first embodiment illustrated in the accompanying figures, each through-hole 30 has a substantially identical shape to the shape of the corresponding through-opening 27 in the upper wall 26 and a smaller size than the size of the corresponding through-opening 27 in the upper wall 26. In this case, the perimeter portion 30*a* of the through-hole 30 is completely contacted by the lower end portion of the containers for pharmaceutical use 100. In a further embodiment not illustrated, each through-hole 30 is shaped differently from the shape of the corresponding through-opening 27 in the upper wall 26 and is of a size that prevents the container for pharmaceutical use 100 from passing through the through-hole 30. In this case, the perimeter portion 30*a* of the through-hole 30 is only partially contacted by the lower end portion of the container for pharmaceutical use 100. For each through-opening 27 in the upper wall 26 there is a respective through-hole 30 in the lower wall 28.

Each tray 25 further comprises an intermediate wall 31 interposed in a transverse direction to the upper wall 26 and the lower wall 28. The intermediate wall is advantageously connected to the upper wall 26 and the lower wall 28 by spacers 29. The intermediate wall 31 comprises a plurality of through-openings 32. The through-openings 32 are equidistant from each other and evenly distributed on the intermediate surface 31, as shown in FIG. 7. The through-openings 32 are identical in shape and size to the through-openings 27 in the upper wall 26. The through-openings 32 are transversely aligned with the through-openings 27 of the upper wall 26. For each through-opening 27 in the upper wall 26 there is a corresponding through-opening 32 in the intermediate wall.

The through-openings 27 in the upper wall 26, the through-openings 32 in the middle wall 31 and the through-openings 30 in the lower wall 28 define the housing seats 25*a*.

Each tray 25 is configured to be coupled to and removed from the transport branch 22 and return branch 23 of the transport device 21.

In this regard, the system 10 comprises at least a first pick and place device 33 placed at the entry station 12. In the embodiment shown in FIG. 1, there is only one pick and place device 33. The system 10 also comprises a plurality of loading holders 34 also located at the entry station 12 (depicted in FIG. 1). The loading holders 34 are configured to receive and house a plurality of trays 25. The first pick and place device 33 is configured to move and operate between the plurality of loading holders 34, the transport branches 22 and the return branch 23. The first pick and place device 33 is also configured to handle the trays 25, preferably to handle one tray 25 at a time. In the preferred embodiment of the present disclosure, the first pick and place device 33 comprises an arm 35 with six degrees of freedom. As an example, the first pick and place device 33 may be an anthropomorphic arm. As schematically illustrated in FIG. 5, each tray 25 comprises gripping handles 36 to be properly gripped and moved by the first pick and place device 33.

A loading chamber 37 is provided at the entry station 12. The loading chamber 37 is configured to accommodate the first pick and place device 33 and the plurality of loading holders 34. The loading chamber 37 is placed inside a first further clean room 38. The first further clean room 38 is ISO class 6. The loading chamber 37 serves as an intermediate chamber between the external environment and the heating tunnel 11. The first further clean room 38 comprises an insertion opening 39 which allows the introduction and removal of loading holders 34 and trays 25 from the external environment into the first further clean room 38 and loading chamber 37. The first further clean room 38 comprises a passage opening 40 which allows the introduction and removal of trays 25 from the heating tunnel 11 into the first further clean room 38 and the loading chamber 37.

The system 10 comprises at least one second pick and place device 41 placed at the exit station 13. In the embodiment shown in FIG. 1, there is only one pick and place device 41. The system 10 further comprises a plurality of exit holders 42 also placed at the exit station 13 (depicted in FIG. 1). The unloading holders 42 are configured to receive and accommodate a plurality of tray 25. The second pick and place device 41 is configured to move and operate between the plurality of unloading holders 42, the transport branches 22 and the return branch 23. The second pick and place device 41 is also configured to move the trays 25, preferably to move one tray 25 at a time. In the preferred embodiment of the present disclosure, the second pick and place device 41 comprises an arm 43 with six degrees of freedom. By way of example, the second pick and place device 41 can be an anthropomorphic arm. The gripping handles 36 of the trays are configured to be correctly gripped by the second pick and place device 41.

At the exit station 13 there is an unloading chamber 44. The unloading chamber 44 is configured to accommodate the second pick and place device 41 and the plurality of unloading holders 42. The unloading chamber 44 is placed inside a second further clean room 45. The second further clean room 45 is ISO class 6. The unloading chamber 44 serves as an intermediate chamber between the external environment and the heating tunnel 11. The second further clean room 45 comprises an insertion opening 46 which allows the introduction of trays 25 from the heating tunnel 11 into the second further clean room 45 and into the unloading chamber 44. The second further clean room 45 comprises an exit opening 47 which allows the introduction and removal of unloading holders 34 and trays 25 from the external environment into the first further clean room 38 and loading chamber 37.

In the example embodiment described above and illustrated in the accompanying figures, when a plurality of containers for pharmaceutical use 100 are to undergo heat treatment, a first set of containers for pharmaceutical use 100 is brought into the loading chamber 37 and inserted into an empty tray 25 in the loading chamber 37, e.g. placed on the loading holders 34. Alternatively, the first set of containers for pharmaceutical use 100 already placed in a tray 25 is brought together with the tray 25 to the loading chamber 37. The first pick and place device 33 picks up the tray 25 containing the first set of containers for pharmaceutical use 100 and associates it with one of the transport branches 22. Alternatively, the first set of containers for pharmaceutical use 100 is placed in a tray 25 on the entry connecting section 22*a* and the tray 25 reaches one of the transport branches 22.

The association of the tray 25 with the transport branch 22 (or its inlet into the transport branch 22) occurs at a first instant of association t1.

In the meantime, a second set of containers for pharmaceutical use 100 is placed in another empty tray 25 as described above. This tray is associated by the first pick and place device 33 with a further transport branch 22 (or enters the further transport branch 22) at a second instant of association t2.

Similarly, a third set of containers for pharmaceutical use 100 is placed in another empty tray 25 in the manner described above. This tray is associated by the first pick and place device 33 with a further transport branch 22 (or enters the further transport branch 22) at a third instant of association t3.

Referring to FIG. 3, the first set of containers for pharmaceutical use 100 is placed on the lowest transport branch 22 for those looking at FIG. 3, the second set of containers for pharmaceutical use 100 is placed on the central transport branch 22 for those looking at FIG. 3, and the third set of containers for pharmaceutical use 100 is placed on the highest transport branch 22 for those looking at FIG. 3.

Referring to FIG. 4, the first set of containers for pharmaceutical use 100 enters the lowest transport branch for those looking at FIG. 4, the second set of containers for pharmaceutical use 100 enters the central transport branch for those looking at FIG. 4, and the third set of containers for pharmaceutical use 100 enters the highest transport branch for those looking at FIG. 4.

The instant of association t1 precedes the second instant of association t2 which in turn precedes the third instant of association t3. The first instant of association t1 is temporally separated from the second instant of association t2 by an amount equal to that which temporally separates the second instant of association t2 from the third instant of association t3.

In the time between the first instant of association t1 and the second instant of association t2, the tray 25 deposited first has travelled a distance D1/2 on the respective transport branch 22. In the time between the second instant of association t2 and the third instant of association t3, the tray 25 deposited second travelled a distance D1/2 on the respective transport branch 22 and the tray 25 deposited third travelled a distance equal to D1 on the respective transport branch 22. The distance D1 is equal to the length in the longitudinal direction of the tray 25 multiplied by a factor F equal to 2.

Meanwhile, a fourth set of containers for pharmaceutical use 100 is placed in another empty tray 25 as described above. This tray is associated with a fourth instant of association t4 by the first pick and place device 33 on the transport branch 22 in which the first set of containers for pharmaceutical use 100 was inserted. Alternatively, the fourth set of containers for pharmaceutical use 100 is inserted into a tray 25 on the entry connecting section 22*a* and the tray reaches, at the fourth instant of association t4, the transport branch 22 into which the first set of containers for pharmaceutical use 100 had entered.

Likewise, a fifth set of containers for pharmaceutical use 100 is placed in another empty tray 25 as described above. This tray is associated with a fifth instant of association t5 by the first pick and place device 33 on the transport branch 22 in which the second set of containers for pharmaceutical use 100 was inserted. Alternatively, the fifth group of containers for pharmaceutical use 100 is inserted into a tray 25 on the entry connecting section 22*a* and the tray reaches, at the fifth instant of association t5, the transport branch 22 into which the second group of containers for pharmaceutical use 100 had entered.

Likewise, a sixth set of containers for pharmaceutical use 100 is placed in another empty tray 25 as described above. This tray is associated with a sixth instant of association t6 by the first pick and place device 33 on the transport branch 22 in which the third set of containers for pharmaceutical use 100 was inserted. Alternatively, the sixth group of containers for pharmaceutical use 100 is inserted into a tray 25 on the entry connecting section 22*a* and the tray reaches, at the sixth instant of association t6, the transport branch 22 into which the third group of containers for pharmaceutical use 100 had entered.

The fourth instant of association t4 follows the third instant of association t3 and precedes the fifth instant of association t5 which in turn precedes the sixth instant of association t6. The fourth instant of association t4 is temporally separated from the fifth instant of association t5 by an amount equal to that which temporally separates the fifth instant of association t5 from the sixth instant of association t6. Moreover, the fourth instant of association t4 is temporally separated from the third instant of association t3 by an amount equal to that which temporally separates the fourth instant of association t4 from the fifth instant of association t5.

During a first waiting time between the fourth instant of association t4 and the first instant of association t1, the tray 25 first deposited travelled a distance D1+D1/2 on the respective transport branch 22. During a first waiting time between the fifth instant of association t5 and the second instant of association t2, the tray 25 deposited second travelled a distance D1+D1/2 on the respective transport branch 22. During a first waiting time between the sixth instant of association t6 and the third instant of association t3, the tray 25 deposited third travelled a distance D1+D1/2 on the respective transport branch 22.

Thus, on each transport branch 22 the trays 25 simultaneously transported inside the heating tunnel 11 are separated from each other by equal distances D1. These distances are measured (as schematically illustrated in FIGS. 3 and 4) between the end of one tray 25 and the beginning of the tray 25 preceding it.

In this way, one tray 25 arrives at the exit station 13 from the heating tunnel 11 at a time, i.e. two or more trays 25 never arrive at the same time.

In the embodiment in FIG. 3, when a tray 25 containing a set of containers for pharmaceutical use 100 has passed through the heating tunnel 11, this tray 25 is picked up by the second pick and place device 41. The picked tray 25 is placed in an unloading holder 42 and the set of containers for pharmaceutical use 100 that has undergone heat treatment is withdrawn from the tray 25 to be sent to subsequent processing stations. Alternatively, the set of containers for pharmaceutical use 100 is withdrawn from the tray 25 without being placed in an unloading holder 42.

Alternatively, in the embodiment in FIG. 4, when a tray 25 containing a set of containers for pharmaceutical use 100 has passed through the heating tunnel 11, the tray 25 exits the transport branch and enters the exit connecting section 22*b*. From this tray 25, the heat-treated set of containers for pharmaceutical use 100 is picked while the tray travels through the exit connecting section 22*b*.

The removal of any tray 25 from any transport branch (or its exit from any transport branch 22) occurs at a different removal time from the removal time of any other tray 25 from any transport branch (or its exit from any transport branch 22).

The time separating two temporally successive removal times is equal to the time separating two temporally consecutive instants of association.

A second waiting time separating two successive removal times from the same transport branch 22 is equal to the first waiting time separating two successive instants of association on the same transport branch 22.

In the embodiment in FIG. 3, the tray 25 from which the containers for pharmaceutical use 100 have been removed (whether it has been deposited in an unloading holder 42 or not) is associated with the return branch 23.

In the embodiment in FIG. 4, the tray 25 from which the containers for pharmaceutical use 100 were removed reaches the return branch 43 via the exit connecting section 22*b*.

In both cases, the empty trays 25 travel along the return branch 23 (without losing their sterility) and reach the entry station 12 again.

In the preferred embodiment of the present disclosure, the empty trays 25 travelling along the return branch 23 are spaced in the longitudinal direction by identical distances D2. These distances D2 are smaller than the distance D1.

The preferred embodiments of the disclosure have been described above to explain the principles of the present disclosure and its practical application to thereby enable others skilled in the art to utilize the present disclosure. However, as various modifications could be made in the constructions and methods herein described and illustrated without departing from the scope of the present disclosure, it is intended that all matter contained in the foregoing description or shown in the accompanying drawings, including all materials expressly incorporated by reference herein, shall be interpreted as illustrative rather than limiting. Thus, the breadth and scope of the present disclosure should not be limited by the above-described exemplary embodiment but should be defined only in accordance with the following claims appended hereto and their equivalents.

What is claimed is:

1. A heating system for containers for pharmaceutical use comprising:
- a heating tunnel;
- an entry station to the heating tunnel;
- an exit station from the heating tunnel;
- a transport device for containers for pharmaceutical use comprising at least one transport branch comprising a conveyor belt defining a first transport path between the entry station and the exit station from the heating tunnel and at least one return branch comprising a conveyor belt defining a second transport path between the exit station and the entry station;
- wherein said transport branch and said return branch of the transport device pass through said heating tunnel.

2. The heating system according to claim 1, wherein said transport device comprises a plurality of trays, wherein each tray comprises a plurality of housing seats for respective containers for pharmaceutical use; each tray of said plurality of trays being configured to travel along said at least one said transport branch and said at least one return branch.

3. The heating system according to claim 2, wherein each tray of said plurality of trays comprises an upper wall and a lower wall spaced along a transverse direction from said upper wall; each housing seat comprising a through-opening in said upper wall to allow for the passage of a respective container for pharmaceutical use and said lower wall being configured to receive and support said containers for pharmaceutical use.

4. The heating system according to claim 3, wherein each tray of said plurality of trays comprises an intermediate wall placed transversely between the upper wall and the lower wall; each housing seat comprising a through-opening in said intermediate wall transversely aligned with a corresponding through-opening in the upper wall and configured to allow for the passage of a respective container for pharmaceutical use.

5. The heating system according to claim 3, wherein each housing seat comprises a through-hole in said lower wall, wherein each through-opening of the upper wall corresponds to a respective through-hole and wherein at least one perimeter portion of each through-hole is configured to receive and support a respective container for pharmaceutical use.

6. The heating system according to claim 2, wherein each tray of said plurality of trays is configured to be associated with and to be removed from at least one of said at least one transport branch and said at least one return branch.

7. The heating system according to claim 6, further comprising:
- at least one first pick and place device placed at said entry station and at least one second pick and place device placed at said exit station;
- said at least one first pick and place device being configured to remove a tray from said return branch and to associate a tray with said transport branch; and
- said at least one second pick and place device being configured to remove a tray from said transport branch and to associate a tray with said return branch.

8. The heating system according to claim 7, further comprising:
- a plurality of loading holders placed at said entry station, and a plurality of unloading holders placed at said exit station, said loading holder and said unloading holder being configured to receive and support said trays;
- said at least one first pick and place device being configured to insert and remove said trays from said loading holder; and
- said at least one second pick and place device being configured to insert and remove said trays from said unloading holder.

9. The heating system according to claim 1, further comprising a number R of return branches and a number M of transport branches, wherein M and R are integers and wherein M is greater than R.

10. The heating system according to claim 6, further comprising:
- a number R of return branches and a number M of transport branches, wherein M and R are integers and wherein M is greater than R; and
- wherein on each transport branch of said M transport branches, a plurality of trays are simultaneously present and wherein the trays simultaneously present on a transport branch are spaced from each other in the longitudinal direction by identical distances D1.

11. The heating system according to claim 10, wherein a travel time T between said entry station and said exit station of any tray associated with a respective transport branch of said M transport branches is equal to a travel time T of any other tray associated with any other transport branch between said entry station and said exit station.

12. The heating system according to claim 11, wherein an instant of association of a tray with a transport branch of said M transport branches is different from an instant of association of a tray with any other transport branch of said M transport branches.

13. The heating system according to claim 10, wherein the number of trays carried by said M transport branches in a predetermined time interval is equal to the number of trays carried by said R return branches in said predetermined time interval.

14. The heating system according to claim 1, further comprising a clean room, said heating tunnel being arranged within said clean room.

15. The heating system according to claim 8, further comprising:

a clean room, said heating tunnel being arranged within said clean room;

a first further clean room and a second further clean room placed respectively at the entry station and the exit station; and said first further clean room comprising an insertion opening and said second further clean room comprising an exit opening, said loading holder and said unloading holder being respectively insertable into and removable from said insertion opening and said exit opening.

16. A heating system for containers for pharmaceutical use comprising:

a heating tunnel;

an entry station to the heating tunnel;

an exit station from the heating tunnel;

a transport device for containers for pharmaceutical use comprising at least one transport branch defining a first transport path between the entry station and the exit station from the heating tunnel and at least one return branch defining a second transport path between the exit station and the entry station;

wherein said transport branch and said return branch of the transport device pass through said heating tunnel; and wherein said transport device comprises a plurality of trays; wherein each tray comprises a plurality of housing seats for respective containers for pharmaceutical use;

each tray of said plurality of trays being configured to travel along said transport branch and said return branch.

* * * * *